United States Patent
Kittrell et al.

(10) Patent No.: US 7,773,730 B1
(45) Date of Patent: Aug. 10, 2010

(54) VOICE RECORD INTEGRATOR

(75) Inventors: Clayton Kittrell, Madison, MS (US);
Benjamin Wright, Dallas, TX (US);
Ray Grubbs, Ridgeland, MS (US)

(73) Assignee: Voice Signature LLC, Baton Rouge, LA (US)

( * ) Notice: Subject to any disclaimer, the term of this patent is extended or adjusted under 35 U.S.C. 154(b) by 386 days.

(21) Appl. No.: 10/214,444

(22) Filed: Aug. 8, 2002

Related U.S. Application Data (60) Provisional application No. 60/311,284, filed on Aug. 9, 2001.

(51) Int. Cl.
*H04M 1/64* (2006.01)

(52) U.S. Cl. .......................... 379/68; 380/28

(58) Field of Classification Search ............ 379/68, 379/75; 713/164, 168; 380/259, 28
See application file for complete search history.

(56) References Cited

U.S. PATENT DOCUMENTS

| | | | |
|---|---|---|---|
| 3,879,751 A | 4/1975 | Gimelli | |
| 4,914,586 A | 4/1990 | Swinehart et al. | |
| 4,949,379 A | 8/1990 | Cordell | |
| 4,991,205 A | 2/1991 | Lemelson | 713/186 |
| 5,005,200 A | 4/1991 | Fischer | |
| 5,091,975 A | 2/1992 | Berger et al. | |
| 5,126,543 A | 6/1992 | Bergeron et al. | |
| 5,247,497 A | 9/1993 | Cohn | |
| 5,436,972 A | 7/1995 | Fischer | |
| 5,544,255 A | 8/1996 | Smithies et al. | |
| 5,566,186 A * | 10/1996 | Paterson et al. | 714/736 |
| 5,577,120 A | 11/1996 | Penzias | |
| 5,647,017 A | 7/1997 | Smithies et al. | |
| 5,664,016 A * | 9/1997 | Preneel et al. | 380/28 |
| 5,758,323 A * | 5/1998 | Case | 704/278 |
| 5,781,629 A * | 7/1998 | Haber et al. | 713/177 |
| 5,818,955 A | 10/1998 | Smithies et al. | |
| 5,832,464 A | 11/1998 | Houvener et al. | 705/45 |
| 6,055,552 A | 4/2000 | Curry | 715/530 |
| 6,091,835 A * | 7/2000 | Smithies et al. | 382/115 |
| 6,134,603 A * | 10/2000 | Jones et al. | 719/330 |
| 6,185,316 B1 | 2/2001 | Buffam | |
| 6,199,049 B1 | 3/2001 | Conde et al. | 705/24 |
| 6,209,095 B1 | 3/2001 | Anderson et al. | 713/176 |

(Continued)

FOREIGN PATENT DOCUMENTS

JP 9161494 6/1997

OTHER PUBLICATIONS

Allen v. Wachtendorf, 962 S.W.2d 279 (Tex.App. Corpus Christi 1998).

(Continued)

*Primary Examiner*—Simon Sing
(74) *Attorney, Agent, or Firm*—Steptoe & Johnson LLP (57) ABSTRACT

A voice record integrator receives information to be acknowledged by a user such as a statement of facts, an electronic document, or other record. The system creates a document identifier that may be used to identify the information being acknowledged and uses the document identifier to present a voice script for the user to read. The system records the user reading the voice script and creates a voice record. The voice record may be stored and later used to verify the user's acknowledgement of the statement of facts, electronic document, or other record.

6 Claims, 5 Drawing Sheets

U.S. PATENT DOCUMENTS

| | | | |
|---|---|---|---|
| 6,289,304 B1* | 9/2001 | Grefenstette | 704/9 |
| 6,381,344 B1 | 4/2002 | Smithies et al. | 382/115 |
| 6,389,402 B1 | 5/2002 | Ginter et al. | 705/51 |
| 6,772,342 B1* | 8/2004 | Hawthorne | 713/176 |
| 6,802,041 B1 | 10/2004 | Rehm | 715/500.1 |
| 2002/0031209 A1 | 3/2002 | Smithies et al. | |
| 2002/0095601 A1 | 7/2002 | Hind et al. | 713/201 |
| 2002/0118220 A1 | 8/2002 | Lui et al. | 345/709 |
| 2002/0188497 A1 | 12/2002 | Cerwin | 705/10 |
| 2003/0033241 A1 | 2/2003 | Harari | 705/38 |
| 2003/0093679 A1 | 5/2003 | Hawkins et al. | 713/181 |
| 2003/0120647 A1* | 6/2003 | Aiken et al. | 707/3 |
| 2003/0154172 A1 | 8/2003 | Guyan et al. | 705/80 |

OTHER PUBLICATIONS

Balacheff, Boris, et al., "A Trusted Process to Digitally Sign a Document", NSPW '01, Cloudcroft, NM, Sep. 10-13, 2001, pp. 79-86 (plus 3 pages of citation: p. 1 from ACM and pp. 2-3 from LOC) [ACM 1-58113-457-Jun. 1, 2009].

Steinauer, Dennis D., et al., "Trust and Traceability in Electronic Commerce", StandardView, vol. 5, No. 3., Sep. 1997, pp. 118-124.

Molnar, David, "Signing Electronic Contracts", Crossroads, vol. 7, Issue 1, Sep. 2000, pp. 1-10 (plus citation page), downloaded from: www.acm.org/crossroads/xrds7-1/contract.html.

Gräther, Wolfgang, et al., "Enhancing Workflows by Web Technology", GROUP '97, Phoenix, AZ, 1997, pp. 271-280 [ACM 0-89791-897-5/97/11].

Cole, James, et al, "Extending Support for Contracts in ebXML", Australian Computer Science Communications, vol. 23, Issue 6, Jan. 2001, pp. 119-127 (plus citation page) [IEEE 0-7695-0960-6/01].

Lemay Laura, "Teach Yourself Web Publishing with HTML 4 in 14 days," $2^{nd}$ Professional Reference Edition, Sams.net Publishing, Indianapolice, IN, © 1997, pp. 99-105, 248-257 and 265.

Thimm, Heiko, "The Enhanced CSCW Teleservice for Wide Area Cooperative Authoriing of Multimedia Documents", SIGOIS Bulletin, vol. 15 No. 2, Dec. 1994, pp. 49-57.

Mukhopadhyay, Sugata, et al., "Passive Capture and Structuring of Lectures", ACM Multimedia '99, Orlando, FL, Oct. 1999, pp. 477-487 [ACM 1-58113-151-8/99/0010].

Ströbel, Michael, "Communication Design for Electronic Negotiations on the Basis of XML Schema," WWW 10, Hong Kong, May 1-5, 2001, pp. 9-20 [ACM 1-58113-348-0/01/0005].

Asokan, N., et al., "Optimistic Protocols for Fair Exchange", Fourth ACM Conference on Computer and Communications Security, Zurich, Switzerland, © 1997, pp. 7-17 (plus citation page) [ISBN 0-89791-912-2].

Allen v. Wachtendorf, 962 S.W.2d 279 (Tex.Appl. Corpus Christi 1998).

UNCITRAL Model Law on Electronic Signatures with Guide to Enactment 2001; United Nations Publication Sales No. E.02.V.8, ISBN 92-1-133653-8, 74 pages. 2001.

Lisa Broderick et al., "John Hancock Reinvented: Using Keys and Other Handy Things As Electronic Signatures", PenOp, Inc. 1998, pp. 1-8.

Benjamin Wright, "Eggs in Baskets: Distributing the Risks of Electronic Signatures", http://efa.org/digsig/penop03.txt, Jun. 22, 1995, pp. 1-10.

Benjamin Wright, "The Law of Digital Signatures", Jul. 2002, pp. 1-8.

Illinois Electronic Commerce Security Act With Comments—Final Version, file:///Dl/ecommerce/legis/ill-esca.html, 1998, pp. 1-49.

Department of Health and Human Services, Food and Drug Administration; 21 CFR Part 11, Mar. 20, 1997; pp. 13429-13466.

Preliminary Specifications for Electronic Mortgage Loan Documentation; Jun. 2001, Freddie Mac. pp. 1-52.

One Hundred Sixth Congress of the United States of America, Second Session, Jan. 24, 2000, pp. S.761-1-S.761-13.

Patricia B. Fry, Drafting Committee Memorandum for April UETA Meeting; 2 pages, Mar. 24, 1999.

Office of Management and Budget, Implementation of the Government Paperwork Elimination Act; http://www.whitehouse.gov/omb/fedreg/print/gpea2.html. May 2, 2000.

Web VoiceID.com; http://tompritchard.com/voiceid/welcome.html, Copyright 2000-2002, pp. 1-3.

"Records Management Guidance for Agencies Implementing Electronic Signature Technologies", National Archives and Records Administration, Oct. 18, 2000; pp. 1-18.

Benjamin Wright, Esq., "The Legality of the PenOp® Signature", PenOp Resource Center, Second Edition, 1994, pp. 1-24.

Kathy Lyons-Burke, "Federal Agency Use of Public Key Technology for Digital Signatures and Authentication", NIST Special Publication 800-25; pp. 1-30. Oct. 2000.

Benjamin Wright, supplement to "The Law of Electronic Commerce", Little, Brown and Company 1991, 1994 supplement pp. 43-45.

Benjamin Wright, "Ceremony™ Is A Timely Tool for Satisfying E-Commerce Laws", PenOp Inc, 2000; 3 pages.

Selwood Research, Federal Trade Commission, E-Sign Study—Comment P004102, pp. 1-4. Mar. 16, 2001.

Misner, Robert L. "Tape Recordings, Business Transactions Via Telephone, and the Statute of Frauds," Iowa Law Review, vol. 61, pp. 941-964, 1976.

Congressional Record—Senate, S5284, Jun. 16, 2000.

Ellis Canning Company v. Arthur J. Bernstein. 348 F. Supp. 1212 (D. Colo. 1972).

"Seal-It." J&R Software. http://www.j-r-software.com. Apr. 4, 2002.

* cited by examiner

VOICE RECORD INTEGRATOR

CROSS REFERENCE TO RELATED APPLICATION

This application claims priority from U.S. Provisional Application No. 60/311,284, titled "Voice Record Integrator", and filed Aug. 9, 2001, the contents of which are hereby incorporated by reference.

TECHNICAL FIELD

This disclosure is directed to the use of a voice record as a signature or as a memorial of certain facts.

BACKGROUND

Every day significant business transactions take place electronically. The Census Bureau of the U.S. Department of Commerce estimates that electronic commerce sales in the United States totaled $9.849 billion during the first quarter of 2002. Typically, transactions are conducted by users selecting desired products or services through a website. The user then provides payment information, such as a credit card number, and acknowledges the transaction by clicking on a button. These transactions may be conducted without requiring physical or electronic signatures.

In 2000, the U.S. enacted electronic signature legislation designed to afford electronic signatures the same legal weight as written signatures. This law allows many transactions required to be in writing to be executed electronically. Despite legal acceptance, it is uncommon to enter into some transactions, such as insurance agreements or real property transactions, using anything other than a written signature.

Much of electronic commerce occurs across the Internet, where consumers have instant access to a plethora of information. Consumers may use an increasing variety of devices to conduct electronic commerce across the Internet such as, for example, computers, mobile phones, and personal digital assistants. For example, using a wireless access protocol (WAP) enabled mobile phone, a user may browse and purchase products for delivery.

While even expensive products may be purchased electronically, some transactions usually are not entered electronically. For example, a consumer desiring an insurance policy for a car, house, or boat may be able to apply for an insurance policy electronically; however, most insurance companies require that submitted information be confirmed and signed in writing before issuing the policy. Some insurance companies may issue temporary binders that terminate in a short period of time unless a signed, written agreement is timely submitted by a customer.

Similarly, real estate transactions are rarely carried out electronically, though a home buyer may identify the house of their dreams through a website, contact the listing real estate agent via email, and apply electronically for a mortgage. Despite the home buyer's reliance on the Internet through the whole process, the transaction closing typically involves the home buyer signing a stack of papers before a notary public.

SUMMARY

In one general aspect, a voice record includes an electronic record, and a voice recording including a speakable electronic record identifier summarizing the electronic record. The voice recording is created by taking an audio recording of a user reading a voice script including the speakable electronic record identifier. The electronic record may include any information, such as, for example, a document, a collection of facts to be acknowledged, or an agreement. The voice recording may be created by making an audio recording of a user's voice taken using a microphone or an interactive voice response system.

In another general aspect, a method for creating voice records includes receiving information to be processed, creating a speakable identifier summarizing the received information, creating a voice script including the speakable identifier, recording a user reading the voice script, and creating a voice record including the recorded reading of the voice script. The received information to be processed may include, for example, one or more details of a transaction or a document.

Speakable identifiers may be created using any summarization technique, such as by calculating a cryptographic hash of the received information, by calculating a checksum of the received information, or by calculating a message digest of the received information.

The details of one or more implementations are set forth in the accompanying drawings and the description below. Other features and advantages will be apparent from the description and drawings, and from the claims.

DETAILED DESCRIPTION

In conducting transactions, one may be asked to sign a document such as, for example, a check, an agreement, or an application form, typically by affixing a written signature to the document. A signature is a symbol adopted with the intent to authenticate a record or document. There are no magical incantations required; it makes no difference whether a signer uses signs his name, places an arbitrary mark (e.g., an "X"), or draws a picture. The efficacy of the signature rests in the intent of the signer's action.

Just as a written signature may be affixed to a document, a voice record may be created and associated with a document. A voice record is an audio recording that may be used as a memorial of certain facts or as a signature, expressing an intent to affirm a record or transaction for legal purposes. When used as a signature, a voice record may be referred to as a voice signature. As with other types of signatures, the litmus test with voice is the ability to show that a "voice signature" was adopted with the intent to authenticate a record.

Increasingly, electronic devices (e.g., computers and personal digital assistants) are capable of recording voice statements. Analog devices such as tape recorders are also capable of recording voice statements. These devices may be used to record an individual's voice to create a voice record showing that a particular person stated particular words. These words may indicate the facts memorialized by the voice record, or may indicate a reference to a certain document or facts.

Figure 1:
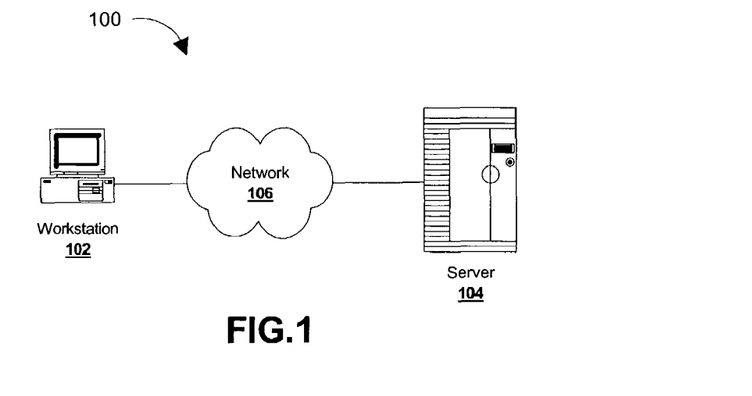
FIG. 1 is an exemplary network architecture for creating a voice record corresponding to electronic data.

Referring to FIG. 1, a voice record system 100 includes a workstation 102 that accesses a server 104 across a network 106. The workstation 102 is an electronic device, such as, for example, a computer, a personal digital assistant, a cellular phone, a video recorder, or an audio recorder, capable of creating an audio recording for use in a voice record. The server 104 is a computer server capable of storing a voice record created using workstation 102. The workstation 102 and server 104 communicate across a network 106 which may be implemented using any communication technique such as, a direct cable connection, a local area network such as Ethernet, or a wide-area network such as the Internet. Using the voice record system 100, a voice record may be created to represent a statement of intent or a statement of observed fact as described below.

Figure 2:
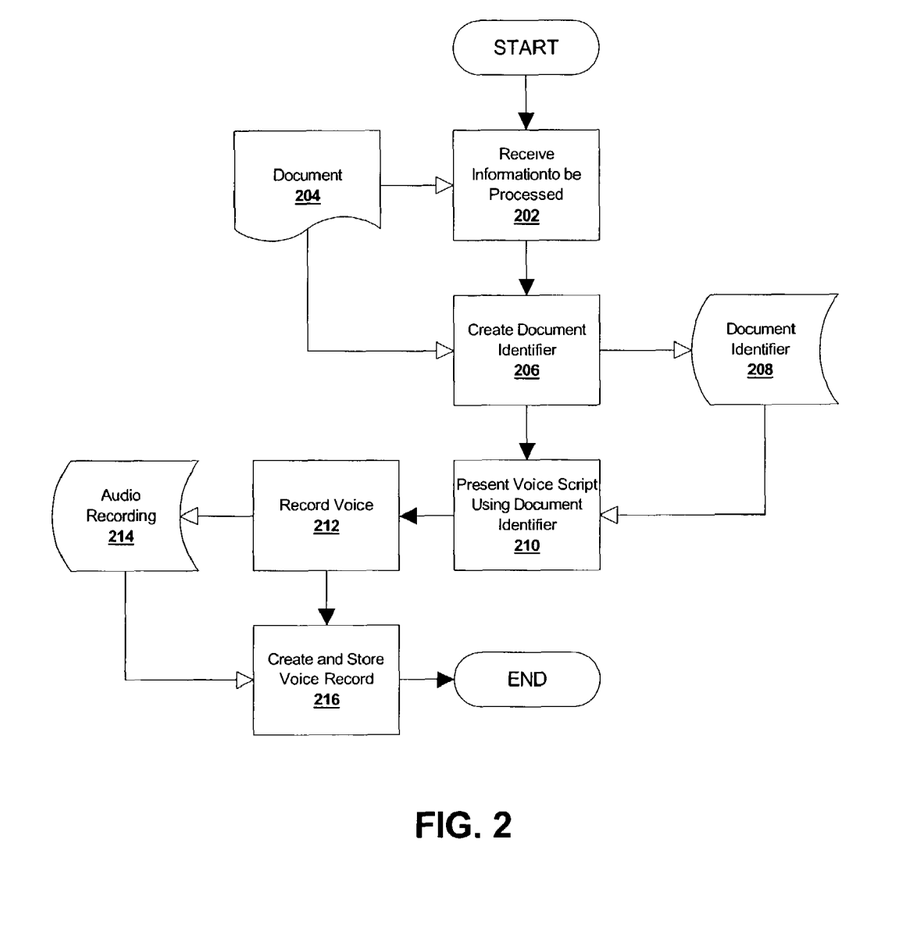
FIG. 2 is a flowchart of a method for creating voice records corresponding to electronic data.

Referring to FIG. 2, a voice record may be created by receiving information that the voice record is to memorialize (step 202). The information may be encoded as an electronic document 204. The electronic document 204 may include any information such as, for example, details of a transaction, a contract, terms of an agreement, an electronic message, or the contents of a digital file. Using the information, the system creates a document identifier 208 that may be used in a voice record script to represent the contents of the document or facts being memorialized.

The document identifier 210 is used to create and present a voice script for recording (step 210). The system records the user reading the voice script (step 212) to create an audio recording 214. The audio recording 214 then is used to create and store a voice record (step 216). To facilitate incorporating the document identifier 210 into a voice script, the document identifier 210 is made speakable so that it may be easily voiced by a user. One way to make a document identifier 210 speakable is to use a function to summarize the content of the document into a small, easily voiced value. For example, a small hash value may be computed that includes a small number of letters and/or numbers. In some implementations, a hash function may return a large, difficult to pronounce identifier. This identifier may be made speakable by using only a portion of that identifier, such as, for example, the first four characters of the hash or every $5^{th}$ character of the hash.

Any reliable representation of the document's content may be used for the document identifier 210. For example, the system may apply a hash function to document 204 to create a document identifier 210. Alternatively, the system may use any representation derived from the document's content.

Without using a document identifier, a voice record still can be linked to a particular person by comparing the sound of the voice on the record to the actual voice of that person or by analyzing the circumstances under which the record was created. The circumstances may show that the particular person in question was probably the one who created the record; however, the voice records without document identifier 208 may include some ambiguities such as referring to other statements or facts in a confusing way. For example, a voice record that says, "I saw them," can under the circumstances be ambiguous as to whether the speaker saw Alice and Bob, or saw three articles of laundry or saw six fish.

Additionally, voice records can be moved from one storage place to another. Unless the voice record is reliably linked to the document or facts at issue, the movement can make it unclear to a future observer what the circumstances of the record's creation were. Also, voice records may be ambiguous under the circumstances.

Therefore, in business transactions voice records of intent or observed facts can be improved if the records are linked or integrated more completely and unambiguously to the intent or observed facts. One way to achieve this result is to have the speaker repeat in the voice record all of his intent or all of the observed facts. For example, the speaker could state, "I now handle a red shirt. I now handle a blue sock. I now handle a green cap." But full repetition of all of the intent or facts can be tedious and can make for long and unwieldy voice records.

The implementation described with respect to FIG. 2 incorporates a document identifier 208 to strongly tie the voice record to the document 204, thus increasing the effectiveness of the resulting voice record in recording the speaker's agreement to the terms or facts described by the document 204.

In an implementation of a voice record system using the method described with respect to FIG. 2, a clothes laundering service uses voice records to record which clothes were handled by a given employee. For example, an employee, Sam, observes and handles a red shirt, a blue sock and a green cap. These are the observed facts to be acknowledged by Sam in a voice record.

First, the system receives information to be processed (step 202). In this implementation, document 204 includes a list of items of laundry obtained through any means. For example, the system may use a barcode scanner to read a barcode on each item of laundry. The collected information forms the document 204 to be acknowledged by a voice record.

The computer system then creates a document identifier (step 206) by summarizing all of the items handled by Sam. For example, the items handled by Sam may be summarized by the color of each item (i.e., "red blue green"). This summary forms the document identifier 208 which is used to create a voice script for presenting to Sam (step 210). The voice script is displayed on a computer display (or presented in any other manner) so that Sam's voice may be recorded (step 212) to create an audio recording 214 of Sam's acknowledgement of the facts. For example, the voice script may read "My name is Sam. I handled red blue green." Sam's voice is recorded using a microphone attached to the computer system. Finally, information from the document 204 and the audio recording 214 are combined to create a voice record which is stored for future verification of Sam's acknowledgment. The voice record includes a summary record integrated with many key elements of the first group of data (i.e., red shirt, blue sock, green cap) and tied to Sam's unique voice. The voice record may serve as evidence that Sam in fact handled a red shirt, a blue sock and a green cap. This would be better evidence than a voice record by Sam that simply said, "I handled three articles."

In this example, the colors of each item laundered are used to represent the information being signed or acknowledged. In other implementations, techniques such as checksums, hash functions, and message digests are used to create a document identifier. A cryptographic hash may be created using an algorithm such as RSA MD5. The algorithm yields a record, known as a hash, that is mathematically linked to the first group of data, but that is typically smaller than the first group of data. The hash serves as a control against the first group of data, such that if the first group of data is changed the hash will no longer match with the group and therefore an observer can know that the group was changed.

Various implementations may use a checksum, hash total or digest in any number of ways to facilitate the desired result. For example, a computer algorithm can summarize a first group of data by determining a checksum. A computer system can display the checksum in the form of alphanumeric characters to the speaker. The speaker then can speak into a microphone to create a voice record corresponding to the first group of data and include in that record a reading of the characters of the checksum.

Figure 3:
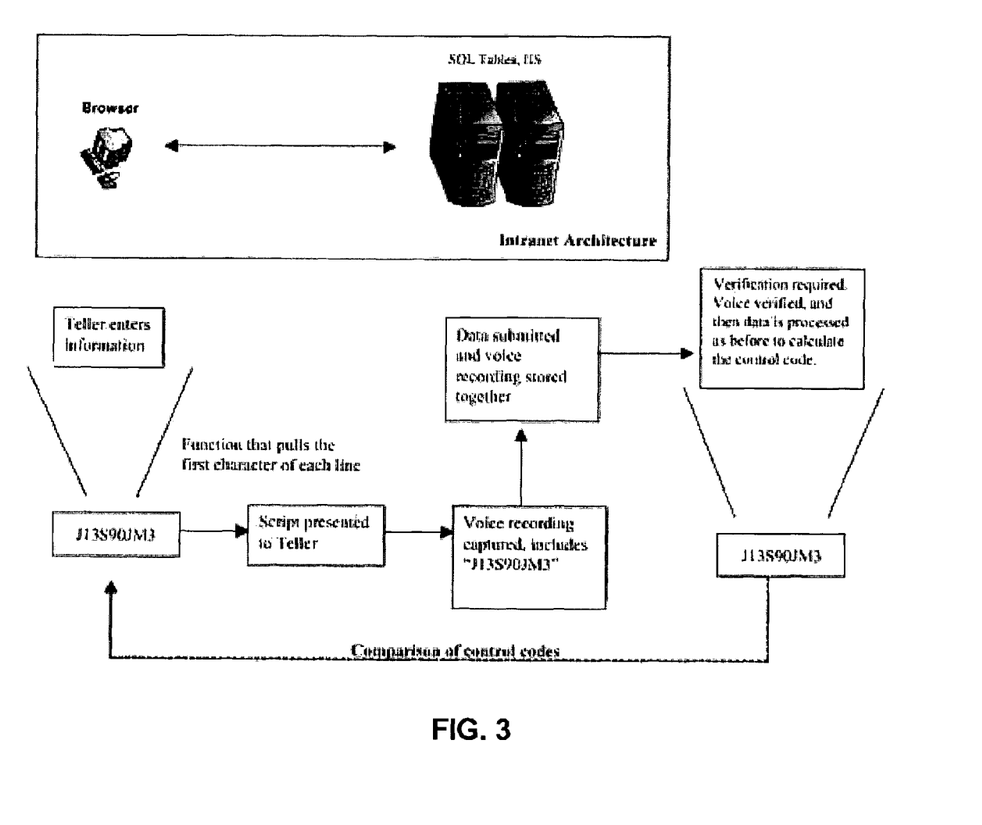
FIG. 3 is a diagram of the creation of a voice record by a bank teller to account for a cash transaction.

Referring to FIG. 3, voice records may be used to record details of cash transactions made by a bank teller. The voice record gives some added security linking specific transactions to specific tellers.

In this implementation, a bank teller, John Doe, records details of a cash transaction using a voice record. The bank teller user a computing device equipped with a web browser and access to a data network to access a website built using, for example, Active Server Pages (ASPs) to provide a voice record creation form. This form resides on a web server such as the Microsoft Internet Information Server. The voice record system may be created using a software development environment such as Microsoft Visual InterDev. The Internet Information Server (IIS) software runs on a application server, such as a Dell PowerEdge 300SC with the following specifications: 2 Intel Pentium III processors at 800 MHz; 100 MHz Front Side Bus; 32 KB Level 1 cache; Intel 330BX chipset; 128 MB 100 MHz PC 100/PC 133 ECC SDRAM; and 10 GB Hard Drive.

The voice record creation system presents a form to the user so that the bank teller may enter information regarding a cash transaction. The bank teller enters information such as that shown below in Table 1.

TABLE 1

| Prompt | User Input |
| --- | --- |
| Record Creator: | John Doe |
| Input 1: | $123456 |
| Input 2: | $345678 |
| Customer: | Sally Smith |
| Customer Account: | 987654 |
| Address: | One Wilson Avenue |
| City: | Jackson |
| State: | Mississippi |
| Zip Code: | 39110 |

After entering this data the bank teller selects a button at the bottom of the form to submit the data for processing. The data is recorded in a Microsoft SQL Table, and another program is called to process the data. The program pulls the first character (excluding dollar signs) from each line of data and generates the following solution: "J13S9OJM3".

This solution is stored in the SQL table, adjacent to the data submitted. After running the calculation and recording the result in the SQL Table, the Microsoft Visual Basic program calls a server side script that pulls the data from the SQL Table and presents the user with a web page that includes the text shown in Table 2.

TABLE 2

Record Number: 22
Record Creator: John Doe
Input 1: $123456
Input 2: $345678
Customer: Sally Smith
Customer Account: 987654
Address: One Wilson Avenue
City: Jackson
State: Mississippi
Zip Code: 39110
If this information is accurate, activate the voice audit log and recite the following message into your microphone: "This is teller John Doe and I am accounting for transaction number 22. The control code for this transaction is J13S9OJM3."

Here, the name and the transaction number are pulled from the SQL Table and inserted into the script. "My name is <insert name> and I am accounting for transaction number <insert number>. The control code for this transaction is <insert control code>."

The bank telleractivates a voice recording function on his computer, which is equipped with a microphone. The voice record is then stored in the SQL table adjacent to the data submitted via the ASP form. In some implementations, the recording function operates in conjunction with a video recording device, such as, for example, using a video camera attached to the computer.

Two years later an auditor wishes to confirm the identified teller in fact submitted the transaction confirmed by a voice record. The auditor takes the data on file in the SQL table and calculates the control code. The result is compared to the result on file in the SQL table. The result is also compared to the code spoken in the voice record. The auditor listens to the sound of the voice record to judge—based on prior personal experience with the voice of John Doe—whether it is in fact the voice of teller John Doe. If the codes all match, and if the voice sounds like that of John Doe, then the auditor possesses substantial accounting evidence that the transaction was entered and controlled by John Doe, and not someone else such as an embezzler.

Figure 4:
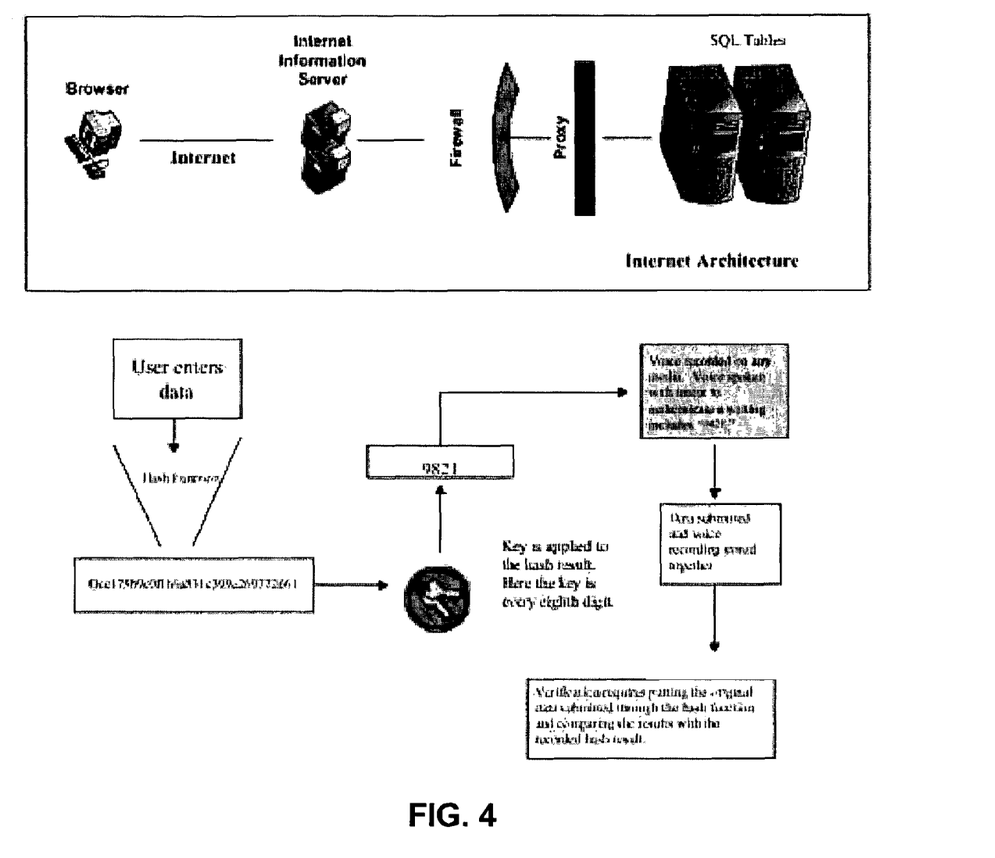
FIG. 4 is a diagram of the creation of a voice record using a speakable identifier created from a cryptographic hash.

Referring to FIG. 4, a voice record system may be implemented using a hash function to generate a document or record identifier. Consider for example, a User going to an intranet site and accessing an Active Server Page (ASP) that serves as a form.

Upon presentation of the ASP form, the user enters the data shown in Table 3. After entering this data the user selects a button at the bottom of the form to submit the data for processing.

TABLE 3

| Prompt | Input |
| --- | --- |
| Record Owner: | John Doe |
| Input 1: | $123456 |
| Input 2: | $345678 |
| Address: | One Wilson Avenue |
| City: | Jackson |
| State: | Mississippi |
| Zip Code: | 39110 |

Data is recorded in a database, and a program is called to process the data by computing a hash, such as the RSA MD-5 Signature Hashing Algorithm. This program pulls the data, runs the necessary calculations, and the generates the following 32 digit solution, such as: "0cc175b9c0f1b6a831c-399e269772661". This solution is stored in the SQL table, adjacent to the data submitted. After running the calculation and recording the result in the SQL Table, the Microsoft Visual Basic program calls a server side script that pulls the data from the SQL Table and presents the user with a web page that summarizes the transaction.

The system presents the following voice script to be read by the user to acknowledge the transaction. "If this information is accurate, telephone 1-800-555-9876 and recite the following message: My name is John Doe and my voice is my password on transaction number 22. The signature code for this transaction is 9821."

The signature code is computed by taking every 8th digit of the 32 digit algorithm result. In this case, the algorithm result stored in the SQL table is "0cc175b9c0f1b6a831c399e-269772661". Every eighth digit of this result would be the numbers "9821." The customer calls the number and hears an automated message instructing him to leave the message at the sound of a "beep." At this point he reads the voice script which is recorded and stored.

Two years later the customer disputes a claim that he submitted the transaction. The company takes the data on file in the SQL table and calculates both the hash algorithm result and the corresponding signature code. The algorithm result is compared to the result on file in the SQL table. The Signature code is compared to the signature code spoken in the voice file. The company uses this information as evidence in its attempts to refute the claim from the customer that he did not submit the data.

Figure 5:
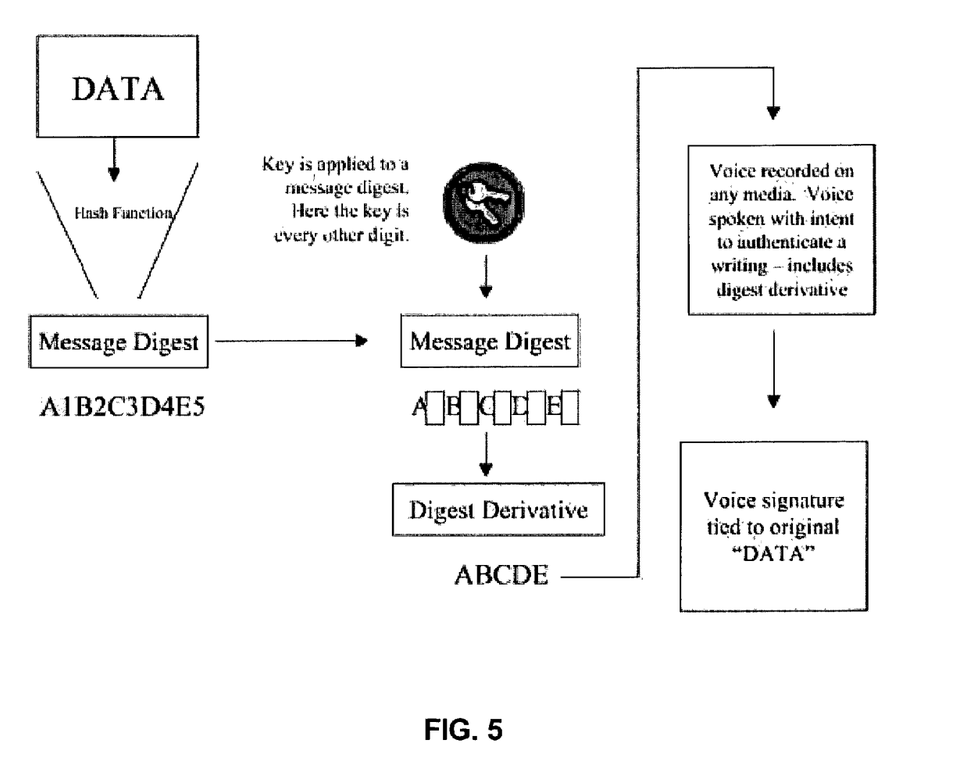
FIG. 5 is a diagram of the creation and integration of a voice record.

FIG. 5 shows a generic voice record system which data to be acknowledged is received and a message digest of the received data is created. A function is applied to the message digest to make it speakable. For example, if the message digest "A1B2C3D4E5" may be reduced to "ABCDE" to create a speakable identifier. A voice script including the speakable identifier "ABCDE" may be presented to a user to read. The user's voice is recorded and tied to the original data so that it may later be used to verify the data.

Figure 6:
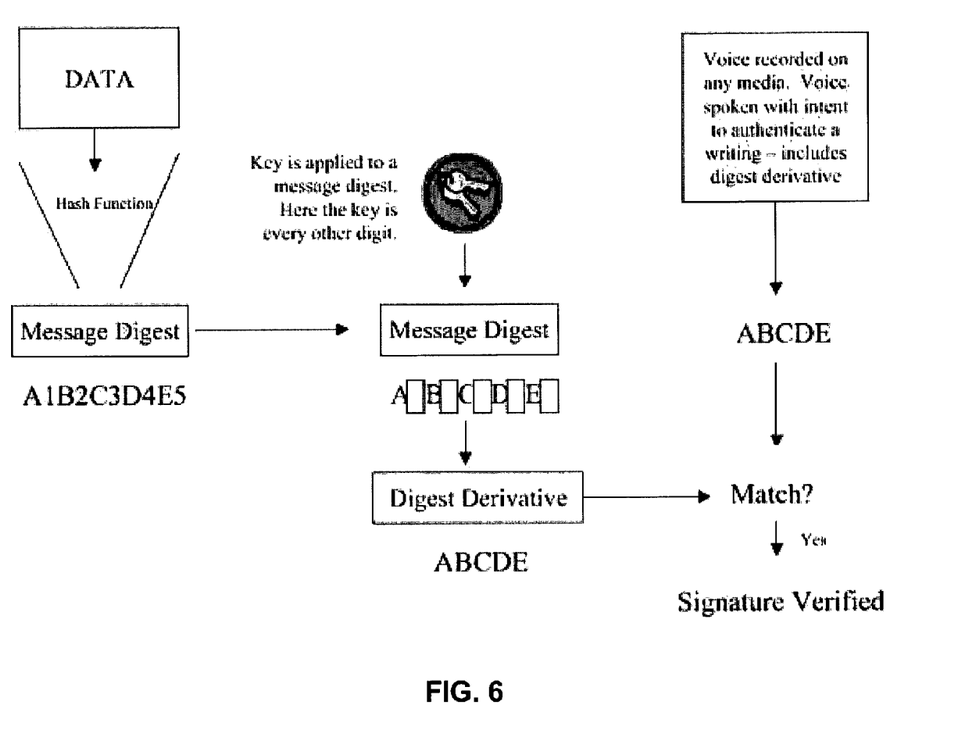
FIG. 6 is a diagram of the verification of an integrated voice record.

FIG. 6 shows how a voice record may be used to verify a user's acknowledgement of the data. The data purportedly acknowledged by the voice record is again processed to create a message digest. A function is applied to the message digest to determine what the speakable identifier should be. In this case, the message digest is "A1B2C3D4E5" and the speakable identifier is "ABCDE." The recorded message may then be played to determine if the same speakable identifier was recorded. If the speakable identifier matches the recording, the user's acknowledgement is verified.

A number of implementations have been described. Nevertheless, it will be understood that various modifications may be made without departing from the spirit and scope of the invention. Accordingly, other implementations are within the scope of the following claims.

What is claimed is:

1. A computer programmed to perform a method for creating voice records as evidence of intent, the method comprising:
   receiving information to be processed;
   creating a speakable identifier using a cryptographic hash of the received information;
   creating a voice script including the speakable identifier;
   recording a user reading the voice script; and
   creating a voice record including the recorded reading of the voice script.

2. The computer of claim 1 wherein receiving information to be processed includes receiving one or more details of a transaction.

3. The computer of claim 1 wherein receiving information to be processed includes receiving a document to be acknowledged.

4. The computer of claim 1 wherein creating a speakable identifier includes selecting a portion the cryptographic hash in a predetermined manner.

5. The computer of claim 4 wherein the predetermined manner is to select every Nth digit of the cryptographic hash.

6. The computer of claim 4 wherein the cryptographic hash is created using at least one of the following: Message-Digest algorithm 4 (MD4), Message-Digest algorithm 5 (MD5), Secure Hash Algorithm (SHA), WHIRLPOOL, and Research and Development in Advanced Communications Technologies in Europe (RACE) Integrity Primitive Evaluation Message Digest (RIPEMD).

* * * * *